(12) United States Patent
MacKarvich

(10) Patent No.: US 6,595,540 B1
(45) Date of Patent: Jul. 22, 2003

(54) PIVOTAL TRAILER HITCH

(76) Inventor: Charles J. MacKarvich, 3940 Paces Manor Dr., Atlanta, GA (US) 30339

( * ) Notice: Subject to any disclaimer, the term of this patent is extended or adjusted under 35 U.S.C. 154(b) by 0 days.

(21) Appl. No.: 10/059,684

(22) Filed: Jan. 28, 2002

(51) Int. Cl.[7] ................................................. B62D 1/55
(52) U.S. Cl. ..................... 280/491.3; 280/498; 280/499
(58) Field of Search ........................... 280/491.3, 491.1, 280/491.4, 498, 499, 462, 478.1, 479.3, 488

(56) References Cited

U.S. PATENT DOCUMENTS

| | | | |
|---|---|---|---|
| 4,125,272 A | * 11/1978 | Putnam, Jr. et al. .... | 280/478 B |
| 4,361,342 A | * 11/1982 | Duffield ................... | 280/491 E |
| 5,011,176 A | * 4/1991 | Eppinette ................. | 280/479.3 |
| 5,308,100 A | * 5/1994 | Heider et al. ............. | 280/474 |
| 6,364,337 B1 | * 4/2002 | Rowland et al. ......... | 280/491.3 |
| 6,375,211 B1 | * 4/2002 | MacKarvich ............ | 280/491.2 |

* cited by examiner

Primary Examiner—Lesley D. Morris
Assistant Examiner—Tony Winner
(74) Attorney, Agent, or Firm—Thomas, Kayden, Horstemeyer & Risley

(57) ABSTRACT

A pivotal hitch assembly (14) includes a housing (22) that is pivotally coupled to mounting plates (57) and (58) that are rigidly attached to a draw bar (60) of a trailer. The housing includes a pair of connector tubes (56) that receive pins (63), (64) that couple the housing (22) to the mounting plates (57), (58). The housing (22) is manufactured from a single blank of material. The connector tubes (56) are formed by bending or rolling a portion of the blank into a generally tubular shape. Bending or folding of the blank forms the housing such that the housing is generally U-shaped.

10 Claims, 5 Drawing Sheets

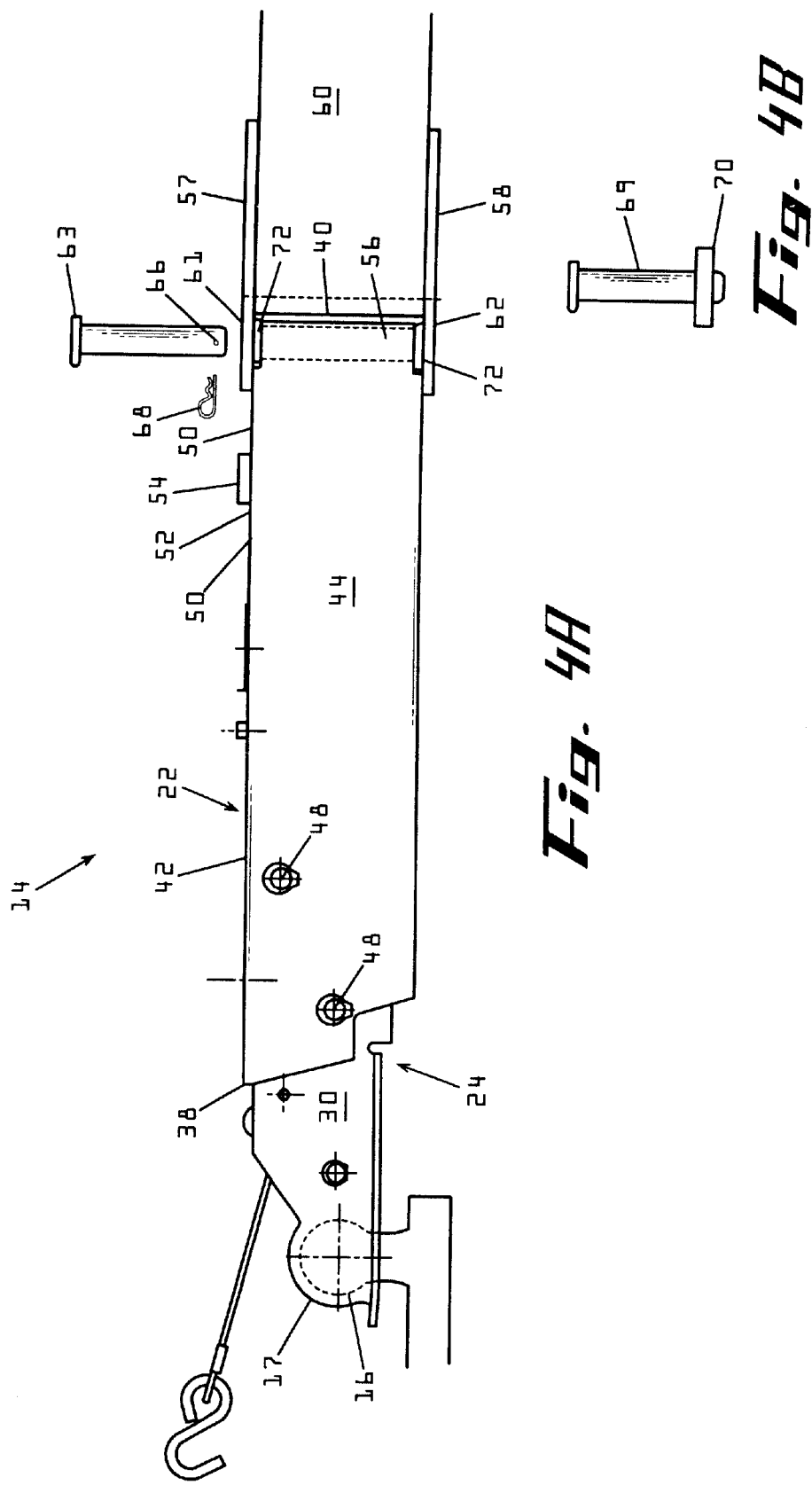

PIVOTAL TRAILER HITCH

FIELD OF INVENTION

The present invention concerns hitch assemblies for trailers and, more particularly, concerns a pivotal hitch assembly that allows the draw bar of a trailer to pivot or fold back on itself to shorten the overall length of the trailer when the trailer is not in use.

BACKGROUND

Many trailers, especially boat trailers, are long and have draw bars that extend far from the rear end of the trailer or the rear end of the boat carried by the trailer. This has the potential of making the storing of a boat and its trailer difficult and/or expensive when the storage is in a garage that is too short. To store a boat and its trailer in a short garage, the owner of the trailer might be forced to choose between expanding the size of the garage where the trailer is to be stored, or buying a smaller trailer. The size of the trailer is important, especially for boat trailers, where the length of the trailer determines the maximum length of the boat that can be safely towed on the trailer.

A solution to over length trailers is a pivotal draw bar. Prior art hitch assemblies having foldable draw bars are taught in U.S. Pat. No. 4,398,742 (Sanders), U.S. Pat. No. 5,503,423 (Roberts et al.) and U.S. Pat. No. 5,890,617 (Rowland et al.).

The Sanders patent discloses a tongue or draw bar of a boat trailer is cut and then the ends are releasably hinged together by a pair of spaced apart, parallel hinge pins, either of which can be withdrawn to permit the forward end of the drawbar to be swung about the remaining pin, and rearwardly to an inactive position which effectively shortens the overall length of the draw bar so that the associated trailer can be readily stored in a conventional garage. The hinge mechanism comprises a pair of tubular members designed to be slid over the cut ends of the draw bar, and then to be bolted and/or welded to the associated draw bar section. Confronting ends of the hinge members have thereon two sets of cooperating hinge barrels, which releaseably support the two hinge pins about spaced apart, vertical axis adjacent opposite sides, respectively of the draw bar.

The Roberts et al. patent discloses a tubular hitch sandwiched between top and bottom plates. Holes through the hitch and plates are aligned with one another and the tubular casing is inserted through the holes. Thereafter, the ends of the tubular casings are swedged or expanded by pressing bullet shaped pins into opposite ends of the casing. The swedging effect securely fastens the components. Finally, pins are inserted through the casings to mount the swing away hitch on the trailer.

The Rowland et al. patent discloses a tongue of a trailer sandwiched between two plates with holes that align with tubular sleeves welded on opposite sides at the end of a hitch cover to convert it to a swing away hitch. Pins are inserted to mount the swing away hitch onto the swing away hitch assembly. In a towing position, both pins stay in their sleeves. In a stow-away position, one pin is removed and the swing away hitch swivels via the remaining pin away to the side of the trailer.

A problem with the prior art foldable trailer draw bar structures is the cost of manufacturing a structurally reliable and strong connector between the foldable parts. The prior art systems include multiple parts that must be aligned, bolted, and/or welded together. Therefore, there exists a need for a strong and easily operated foldable trailer hitch assembly that can be inexpensively manufactured and assembled.

SUMMARY

Briefly described, the present invention includes a pivotal or foldable hitch assembly for trailers. One embodiment of the invention includes a U-shaped housing with the opposed sidewalls with each sidewall including a connector tube. The pair of connector tubes are laterally displaced from each other and their longitudinal axes are upright and oriented parallel to each other. The connector tubes are integrally formed with the housing by bending stubs of the sidewalls into the shapes of tubes. The housing is formed from a blank, which is single piece of a material that is bent along fold lines to produce the pair of opposed sidewalls, the upper wall and the connector tubes.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4A is a side view of the pivotal hitch assembly in towing position.

FIG. 4B is a side view of a lock pin.

DETAILED DESCRIPTION

Figure 1:
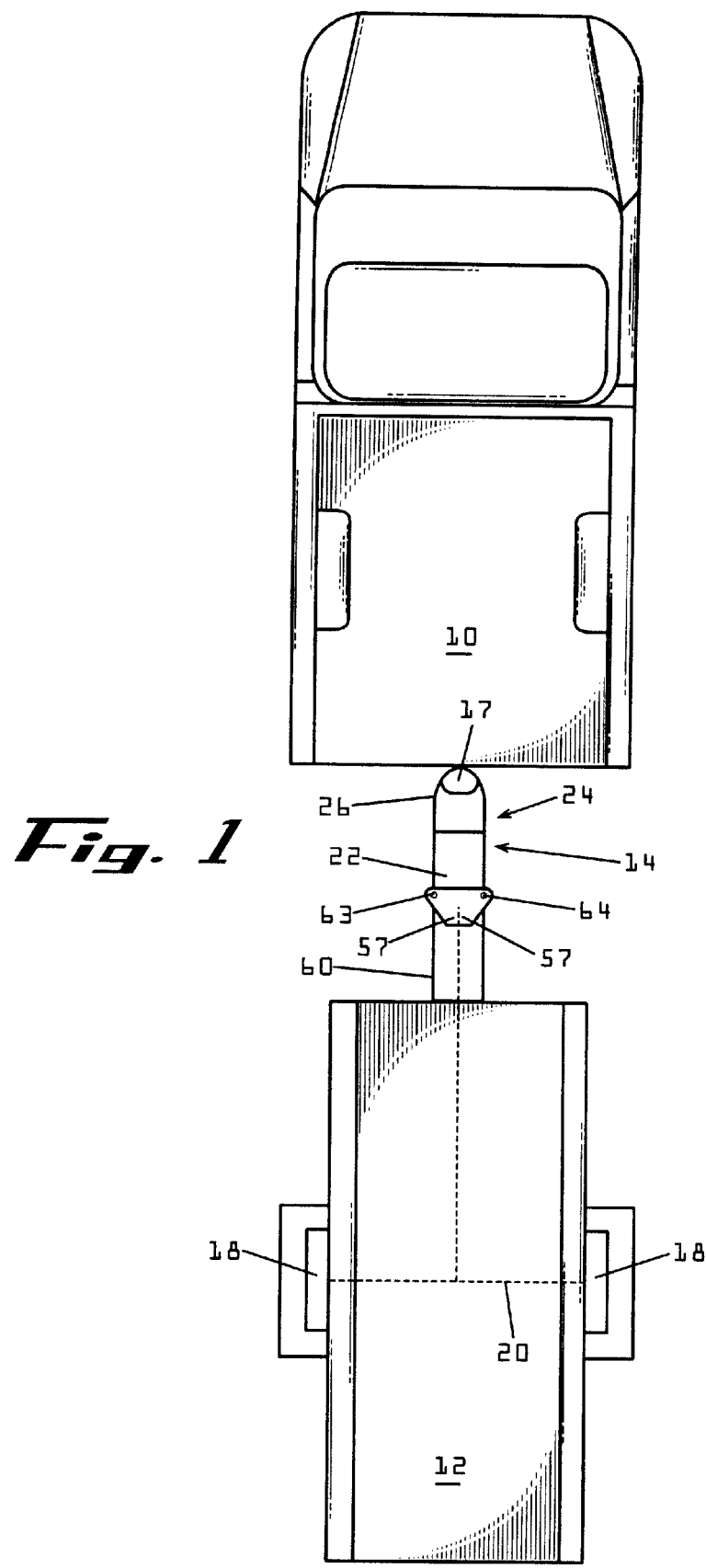
FIG. 1 is a top view of a towing vehicle towing a trailer having a pivotal hitch assembly.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

FIG. 1 shows a towing vehicle 10 that tows a trailer 12 having a pivotal hitch assembly 14. The towing vehicle 10 includes a hitchball 16 (FIG. 4A) that couples the trailer 12 to the towing vehicle 10 via a ball receiving socket 17. The trailer 12 includes brakes 18 (FIG. 3) that are hydraulically connected to the pivotal hitch assembly 14 via brake line 20. Securing the trailer 12 to the towing vehicle 10 is well known in the art and is not be discussed in further detail.

In the preferred embodiment, the pivotal hitch assembly 14 includes a housing 22 that is slidably mounted to a self-actuating brake assembly 24. Referring to FIG. 3, which shows an exploded side view of the housing 22 and the self-actuating brake assembly 24, the self-actuating brake assembly 24 includes a forward coupler 26 and a master brake cylinder 28. The forward coupler has opposed sidewalls 30 having aligned slots 32 formed therein. The master brake cylinder 28 includes threaded openings 34 adapted to receive threaded bolts 35 (see FIG. 2). The master brake assembly 28 is rigidly coupled to the housing 22 by bolts 35 that extend through the housing 22 into the threaded openings 34. Thus, the master brake assembly 28 moves with the housing 22. The forward coupler 26 includes a brake actuator 36 that engages the master brake cylinder 28 and actuates the brakes 18 responsive to forward motion of the housing 22. The aligned slots 32 define the extent of longitudinal motion of the housing 22 with respect to the forward coupler 26.

The housing 22 has a front end 38 and a rear end 40 with an upper surface 42 extending therebetween. A pair of opposed sidewalls 44 extend generally downward from the upper surface 42. The opposed sidewalls 44 include aligned openings 46 for coupling the housing 22 to the forward coupler 26 of the self-actuating brake assembly 24. When the housing 22 is positioned with the forward coupler 26, the coupling openings 46 are aligned with the slots 32 of the forward coupler 26. The slots 32 and coupling openings 46 are adapted to receive pins 48, or bolts, or other coupling means known to those skilled in the art (see FIG. 4A). The pins 48 cannot move relative to the housing 22, but the pins 48 can traverse the longitudinal length of the slots 32. Forward motion of the housing 22 with respect to the forward coupler 26 of the self-actuating brake assembly 24 actuates the brakes 18 and relative rearward motion disengages the brakes 18. Further details of self-actuated brake assembly can be found in allowed U.S. application Ser. No. 09/583,473, which was filed on May 31, 2000 and which is hereby incorporated by reference in its entirety.

In the preferred embodiment, the upper surface 42 of the housing 22 includes a plurality of openings 50 that are aligned with the threaded openings 34 of the master brake cylinder 28 for receiving bolts 35, which mount the master brake cylinder 28 to the housing 22. The upper surface 42 of the housing 22 also includes an opening 52 for receiving cap 54, which is removably affixed to the master brake cylinder 28. When cap 54 is removed hydraulic brake fluid can be added to the to the self-actuating brake assembly 24.

At the rear end 40 of the housing 22 along each of the opposed sidewalls 44 are a pair of opposed horizontally displaced parallel connector tubes 56A and 56B. Each of the tubes 56A and 56B defines an internal passage 56C and 56D about longitudinal axes Z (see FIG. 3), about which the housing 22 can be pivoted.

Figure 2:
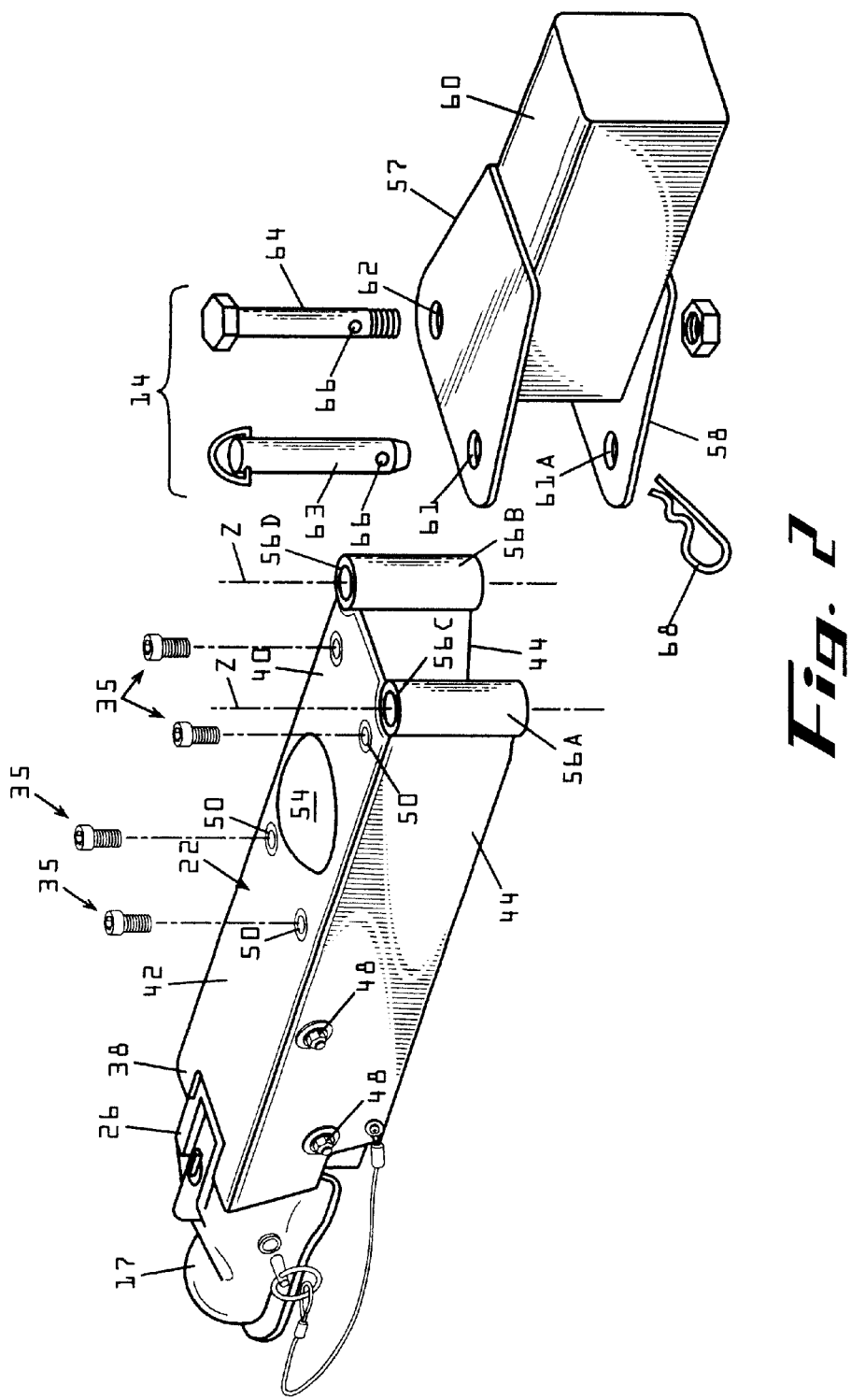
FIG. 2 is a perspective, expanded view of the pivotal hitch assembly.
Figure 3:
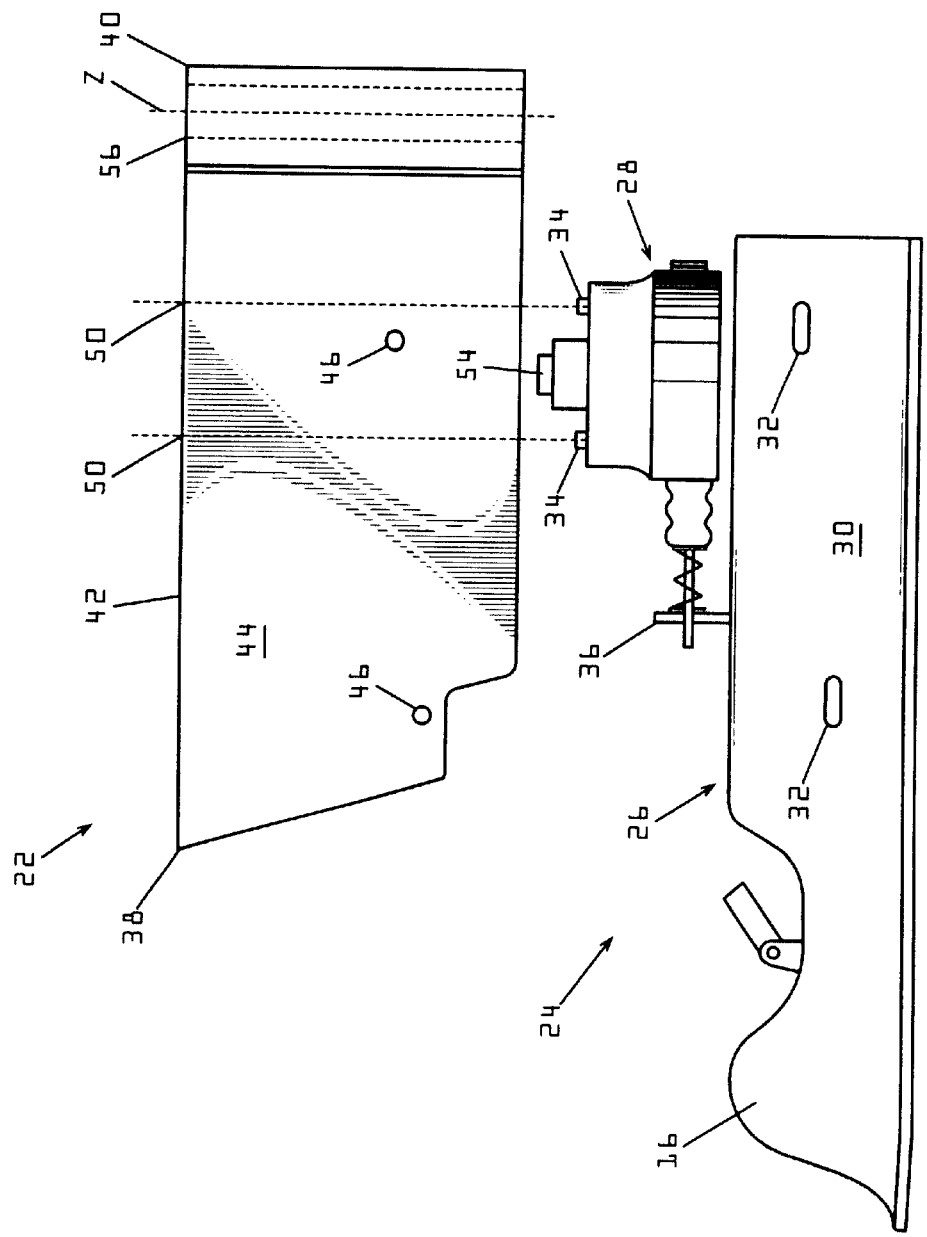
FIG. 3 is an expanded side view of the pivotal hitch assembly.

As best shown in FIG. 2, the pivotal hitch assembly 14 further includes a pair of vertically opposed parallel mounting plates 57 and 58 that are respectively mounted to the top and bottom of a draw bar or tongue 60 of the trailer 12. Each mounting plate 57 and 58 is rigidly affixed to the draw bar 60 by means such as welding. Each mounting plate includes a pair of laterally spaced openings 61 and 62 that are respectively aligned with similar openings such as 61A of the opposed mounting plate.

In the operational or towing position, the pivotal hitch assembly 14 is arranged such that the housing 22 is longitudinally aligned with the tongue 60. The connector tubes 56A and 56B are positioned between the mounting plates 57 and 58. The openings of the mounting plates 57 and 58 are aligned with the passages 56C and 56D of tubes 56A and 56B. With the tubes 56A and 56B and openings 61 and 62 vertically aligned, a pair of pins 63 and 64 are inserted from above into the openings 61 of the mounting plate 57. The pins 63 and 64 extend from the top mounting plate 57 through the tubes 56 to beyond the bottom mounting plate 58. Near the bottom of each of the pins 63 and 64 a hole 66 is formed therethrough for receiving a cotter pin 68. The cotter pins 68 are inserted into the holes 66 to keep the pins 63 and 64 secured within the tubes 56.

To place the pivotal hitch assembly 14 into its storage position, one of the pins 63 or 64 is removed from its operational position and the remaining pin becomes the pivoting pin. For example, if pin 64 is removed, then the housing 22 pivots or folds around the pivoting pin 63 such that the forward coupler 26 is folded rearwardly toward the tongue 60. In an alternative embodiment, the pivoting pin 63 is a threaded bolt that is secured into its tube by a nut.

Referring to FIG. 4B, another embodiment, at least one of the pins 63 or 64 is a lockable pin 69 adapted to receive a lock 70. When the lock 70 is affixed to the lockable pin 69, the lock 70 cannot be removed therefrom without the correct combination or key. Using the lockable pin 69 with the pivotal hitch assembly 14 provides security for the trailer 12. For example, when the lockable pin 69 is removed from its operational position and the housing is pivoted to its storage position, the lockable pin 69 is inserted into the empty tube and the lock 70 is secured thereon, thereby locking the pivotal hitch assembly 14 into storage position because the tube 56 cannot be vertically aligned with the openings 61 and 62 when the lockable pin 69 is inserted into the tube 56. The trailer 12 cannot be towed unless the housing 22 is in towing position, and consequently, locking the pivotal hitch assembly 14 into storage position provides a measure of security for the owner of the trailer 12.

In addition, the housing 22 can be locked out of towing position by inserting the lockable pin through the openings 61 and 62 of the mounting plates 57 and 58 and securing the lock 70 thereon. Again, the empty tube 56 cannot be vertically aligned with the openings 61 and 62 because of the lockable pin 69. In this case, even if the thief were to completely remove the housing 22 from the tongue 60, a different housing could not be attached because the locked pin 69 blocks two of the openings 61 and 62.

For greatest security, each pin 63 and 64 is a lockable pin 69. One lockable pin 69 is used for pivotally locking the housing 22 to the tongue 60, and the other lockable pin 69 is used for locking the housing 22 in a towing or in a storage position.

In the preferred embodiment, the openings 61 and 62 of the mounting plates 57 and 58 are extruded openings having a lip 72 extending there beyond. In operational position, the tubes 56 of the housing 22 are in contact with the lips 72. The lips 72 offset the mounting plates 57 and 58 from the housing 22. Thus, the housing 22 does not bind on the mounting plates 57 and 58 when it is being pivoted. Generally, a lip 72 is formed by drilling, cutting, or punching a first opening in the mounting plate and then using a tapered punch, which has a larger diameter than the first opening, to enlarge the first opening. The tapered punch is forced into the first opening and the larger diameter of the tapered punch causes material at the circumference of the first opening to be extruded outward, thereby producing the lip 72.

Figure 5A:
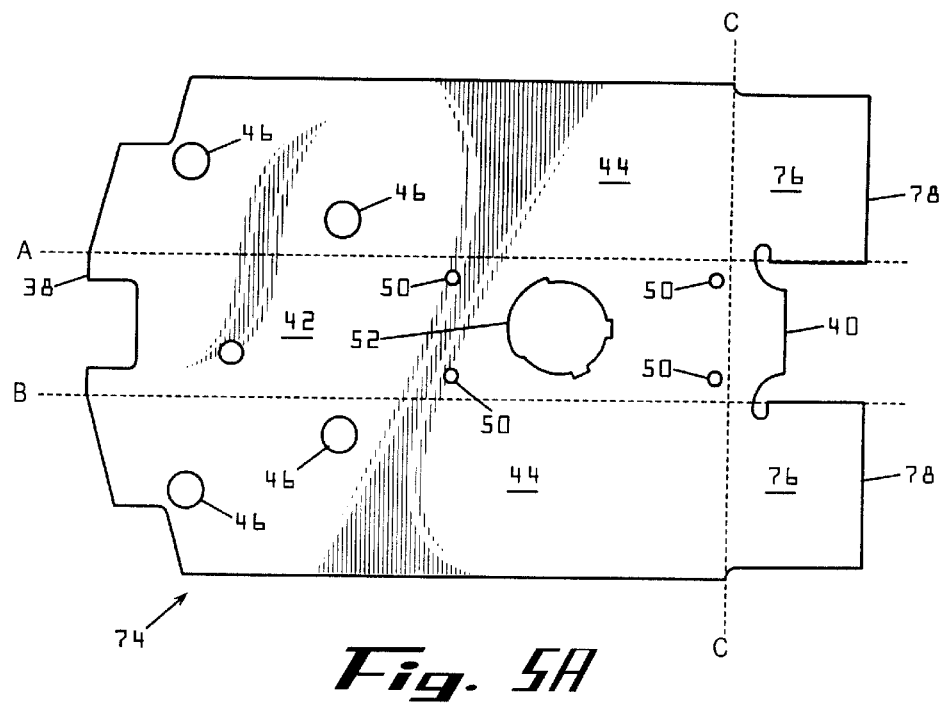
FIG. 5A is a top view of a blank from which a housing for the pivotal hitch assembly is manufactured.

Referring now to FIG. 5A, in the preferred embodiment, the housing 22 is made from a single sheet of material such as heavy gauge steel. The sheet is approximately planar and is cut into a blank 74 having a predetermined perimeter. The blank 74 includes the upper surface portion 42, which extends between the dash lines A and B. Extending outward from the upper surface 42 are tabs that form the sidewalls 44. Each tab for the sidewalls 44 has a coupling stub 76, which extends longitudinally rearward from the dash line C to the distal end 78. The upper surface 42 has the plurality of openings 50 and the opening 52 formed therein, and the tabs that form the sidewalls 44 have the coupling openings 46 formed therein. The openings 46, 50 and 52 are formed by cutting, drilling, punching, or other means known to those skilled in the art.

Figure 5B:
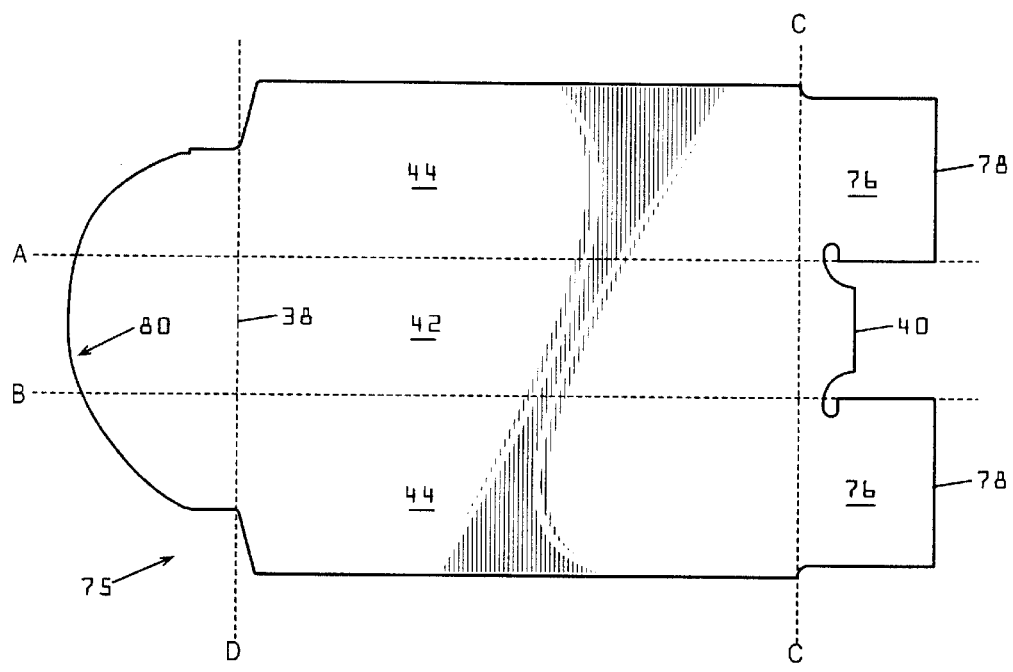
FIG. 5B is a top view of a blank from which a housing for the pivotal hitch assembly is manufactured.

Referring now to FIG. 5B, in another non-limiting embodiment, the blank 74 includes the upper surface portion 42, the sidewall tabs 44 and a hitchball coupling portion 80. The hitchball coupling portion 80 extends longitudinally forward from the dashed line D. In this embodiment, the housing 22 is not coupled to the self-actuating assembly 24, rather the hitchball coupling portion 80 is formed into a socket 17 for receiving the hitchball 16. In that case, the housing 22 couples the trailer 12 to the towing vehicle 10.

To form housing 22 from blank 75, the distal ends 78 of the coupling stubs 76 are rolled or bent upwards and backwards such that the coupling stubs 76 are curved into a generally tubular shape. Generally, the distal ends 78 are rolled or bent backward to approximately align with the dashed line C. In the preferred embodiment, the distal ends 78 are then welded to the blank 75. Next, the sidewall tabs 44 are bent along the dashed lines A and B such that the sidewall tabs 44 extend generally vertically from the upper surface portion 42, thereby forming a generally U-shaped housing. In the preferred embodiment, the sidewall tabs 44 are bent such that the welding bead formed by welding the distal ends 78 to the blank 75 are in the interior of the U-shaped housing 22.

Although an exemplary embodiment of the present invention has been shown and described, it will be apparent to those of ordinary skill in the art that a number of changes, modifications, or alterations to the invention as described may be made, none of which depart from the spirit of the present invention. All such changes, modifications, and alterations should therefore be seen as within the scope of the present invention.

What is claimed is:

1. A pivotal trailer hitch assembly for pivotally coupling a socket for receiving a hitchball to a tongue of a trailer, the pivotal hitch assembly comprising:
   a housing made from one piece of material,
   said housing having a front end and a rear end with an upper wall extending therebetween, opposed first and second sidewalls extending parallel to each other from said upper wall,
   a ball receptacle mounted to said front end of said housing,
   each said side wall integrally including a connector tube with a longitudinal axis, said connector tubes being generally horizontally opposed each other and having parallel longitudinal axes oriented in upwardly extending attitudes,
   said connector tube of said first side wall being characterized by having been formed by bending a first stub of said first side wall into a generally tubular shape, and
   said connector tube of said second side wall being characterized by having been formed by bending a second stub of said second side wall into a generally tubular shape.

2. The pivotal hitch assembly of claim 1, wherein said first stub includes an end that is welded to said first sidewall, and said second stub includes an end that is welded to said second sidewall.

3. The pivotal hitch assembly of claim 1, wherein the first and second sidewalls of said housing each define at least one mounting opening for mounting said housing to a self-actuating brake assembly.

4. The pivotal hitch assembly of claim 1, wherein the upper wall defines at least one mounting opening for mounting a self actuating brake assembly.

5. The pivotal hitch assembly of claim 1, wherein the first end of the housing has a socket for receiving a hitch ball.

6. The pivotal hitch assembly of claim 1, further including:
   a first mounting plate and a second mounting plate for mounting in opposed relationship to a draw bar of a trailer,
   each said mounting plate defining a first opening and a second opening with the first opening of said first mounting plate aligned with the first opening of said second mounting plate and said second opening of said first mounting plate aligned with said second opening of said second mounting plate,
   whereby when the housing and the draw bar are aligned in operational positions, the first openings of the first and second mounting plates are aligned with the tube of the first sidewall and the second openings of the first and second mounting plates are aligned with the tube of the second sidewall.

7. The pivotal hitch assembly of claim 6, wherein the first and second openings of the first mounting plate are extruded openings, and the first and second opening each having a lip extending outward from the first mounting plate.

8. The pivotal hitch assembly of claim 6, further including:

a pair of coupling pins for coupling said housing to said first and second mounting plates, wherein one of the coupling pins is received by said tube of said first side wall and the other said coupling pins is received by the tube of the second sidewall, and at least one of the coupling pins is removable to facilitate positioning of the housing in either a towing or a storage position.

9. The pivotal hitch assembly of claim 8, wherein the at least one removable coupling pins is a locking means for locking the housing in either a towing or a storage position.

10. A pivotal trailer hitch assembly for coupling a socket for receiving a hitch ball to a draw bar of a trailer, comprising:

a coupling sized and shaped to receive a hitch ball of a trailer hitch assembly, a housing formed from sheet metal mounted to said coupling, said housing having a pair of open ended connector tubes formed from said sheet metal, with said connector tubes characterized by having been rolled into their shapes and having parallel longitudinal axes, a pair of mounting plates for mounting to a draw bar of a trailer in spaced parallel relationship for receiving said connector tubes there between, said mounting plates having pin openings spaced apart the same distance as the spacing of said connector tubes so that said pin openings become aligned with said connector tubes when said draw bar and said housing are aligned, and connector pins sized and shaped to extend into said pin openings of said mounting plates and into said connector tubes to lock said housing and said coupling to said draw bar, whereby one of said connector pins can be removed from said mounting plates and said connector tubes to permit the housing and coupling to pivot with respect to the draw bar.

* * * * *